(12) United States Patent
Ramirez Flores et al.

(10) Patent No.: US 11,902,341 B2
(45) Date of Patent: Feb. 13, 2024

(54) PRESENTING LINKS DURING AN ONLINE PRESENTATION

(71) Applicant: LENOVO (Singapore) PTE. LTD., New Tech Park (SG)

(72) Inventors: Axel Ramirez Flores, Cary, NC (US); Tobias Christensen, San Francisco, CA (US); Russell Speight VanBlon, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/212,409

(22) Filed: Mar. 25, 2021

(65) Prior Publication Data
US 2022/0311813 A1    Sep. 29, 2022

(51) Int. Cl.
*H04L 65/402* (2022.01)
*H04L 65/403* (2022.01)

(52) U.S. Cl.
CPC ........ *H04L 65/4025* (2022.05); *H04L 65/403* (2013.01)

(58) Field of Classification Search
CPC .. H04L 65/4023; H04L 65/403; H04L 65/601
See application file for complete search history.

(56) References Cited

U.S. PATENT DOCUMENTS

| | | | | |
|---|---|---|---|---|
| 6,963,906 B2* | 11/2005 | Portuesi | ................. | G06F 16/748 709/217 |
| 7,620,914 B2* | 11/2009 | Li | ......................... | H04N 5/445 715/854 |
| 8,719,031 B2* | 5/2014 | Gibbon | ................. | H04L 65/403 704/251 |
| 8,983,191 B2* | 3/2015 | Robinson | ............. | G06V 20/635 382/190 |
| 9,165,406 B1* | 10/2015 | Gray | ....................... | H04N 7/183 |
| 9,411,789 B1* | 8/2016 | Chitta | .................... | H04L 65/403 |
| 2007/0250775 A1* | 10/2007 | Marsico | ............. | H04N 21/4333 715/716 |
| 2011/0238192 A1* | 9/2011 | Shah | ....................... | H04L 63/107 700/94 |
| 2014/0040273 A1* | 2/2014 | Cooper | .................... | G06F 16/41 707/E17.061 |
| 2014/0359656 A1* | 12/2014 | Banica | .................. | H04N 21/234 725/32 |
| 2018/0343489 A1* | 11/2018 | Loheide | ............... | H04L 65/4084 |
| 2021/0092168 A1* | 3/2021 | Ranalli | ................. | H04L 65/403 |

* cited by examiner

*Primary Examiner* — Nam T Tran
(74) *Attorney, Agent, or Firm* — Kunzler Bean & Adamson

(57) ABSTRACT

Apparatuses, methods, systems, and program products are disclosed for presenting links during an online presentation. An apparatus includes a processor and a memory that stores code executable by the processor. The code is executable by the processor to receive content that is presented as part of an online presentation, process the received content to identify at least one uniform resource locator ("URL") in the received content, and present an interactive graphical element representing the at least one URL on a display device. The interactive graphical element includes a link to an online location associated with the URL such that the online location is accessible in response to interacting with the interactive graphical element.

20 Claims, 6 Drawing Sheets

PRESENTING LINKS DURING AN ONLINE PRESENTATION

FIELD

The subject matter disclosed herein relates to computing devices and more particularly relates to presenting links during an online presentation.

BACKGROUND

Online presentations such as video conferences may include graphical and audio content that is presented during the presentation. The graphical and audio content that is presented may include links to external sources, which may be static such that the user cannot interact with the links.

BRIEF SUMMARY

Apparatuses, methods, systems, and program products are disclosed for presenting links during an online presentation. An apparatus, in one embodiment, includes a processor and a memory that stores code executable by the processor. In certain embodiments, the code is executable by the processor to receive content that is presented as part of an online presentation, process the received content to identify at least one uniform resource locator ("URL") in the received content, and present an interactive graphical element representing the at least one URL on a display device. In one embodiment, the interactive graphical element includes a link to an online location associated with the URL such that the online location is accessible in response to interacting with the interactive graphical element.

A method for presenting links during an online presentation, in one embodiment, includes receiving, by a processor, content that is presented as part of an online presentation, processing the received content to identify at least one uniform resource locator ("URL") in the received content, and presenting an interactive graphical element representing the at least one URL on a display device. In one embodiment, the interactive graphical element includes a link to an online location associated with the URL such that the online location is accessible in response to interacting with the interactive graphical element.

A computer program product for presenting links during an online presentation, in one embodiment, includes a computer readable storage medium having program instructions embodied therewith. In certain embodiments, the program instructions are executable by a processor to receive content that is presented as part of an online presentation, process the received content to identify at least one uniform resource locator ("URL") in the received content, and present an interactive graphical element representing the at least one URL on a display device. In one embodiment, the interactive graphical element includes a link to an online location associated with the URL such that the online location is accessible in response to interacting with the interactive graphical element.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
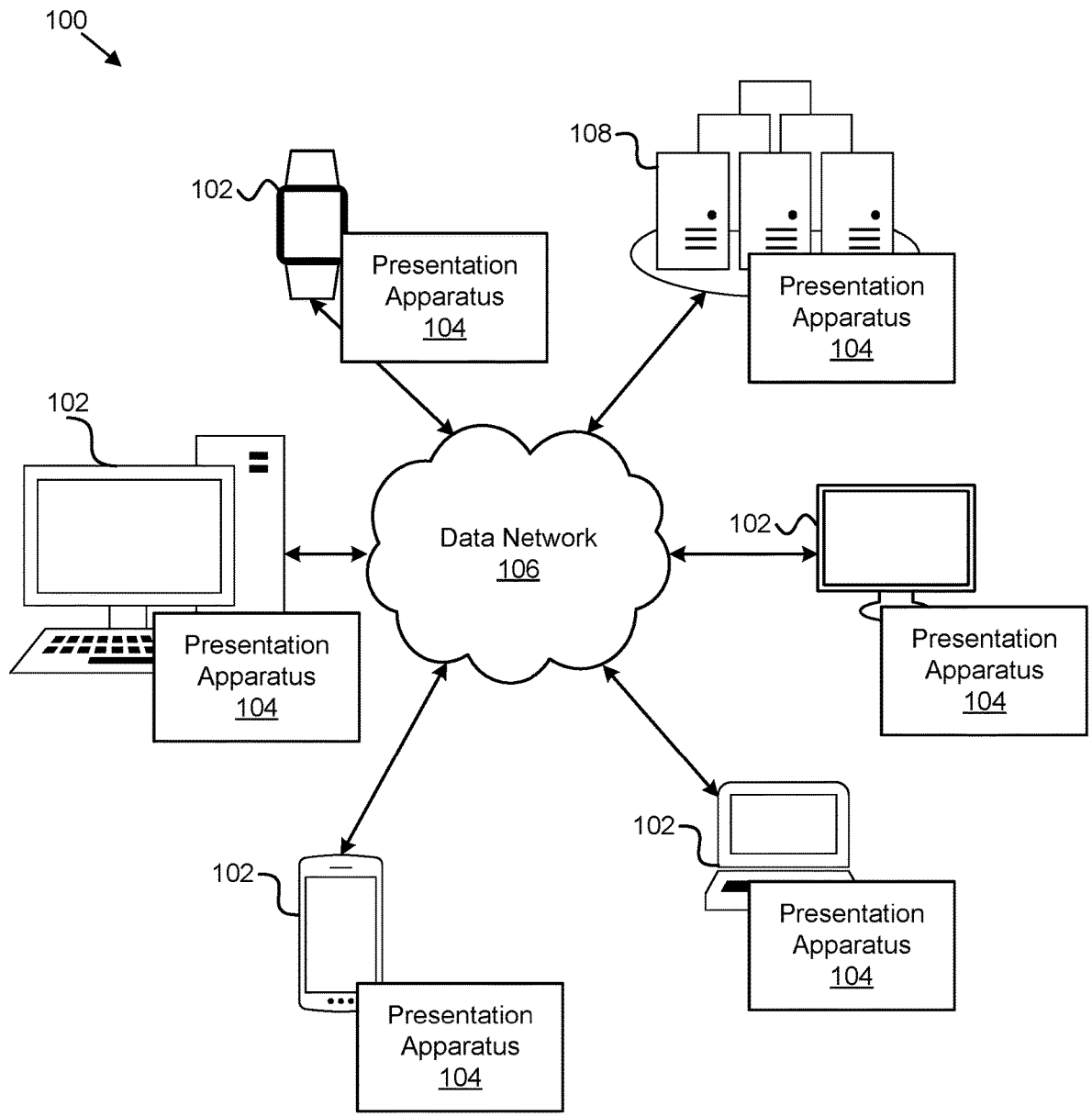
FIG. 1 is a schematic block diagram illustrating one embodiment of a system for presenting links during an online presentation.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus, in one embodiment, includes a processor and a memory that stores code executable by the processor. In certain embodiments, the code is executable by the processor to receive content that is presented as part of an online presentation, process the received content to identify at least one uniform resource locator ("URL") in the received content, and present an interactive graphical element representing the at least one URL on a display device. In one embodiment, the interactive graphical element includes a link to an online location associated with the URL such that the online location is accessible in response to interacting with the interactive graphical element.

In one embodiment, the received content comprises graphical content presented during the online presentation and the identified at least one URL comprises at least one hyperlink presented on the display device that is not interactive.

In one embodiment, the code is executable by the processor to present the interactive graphical element representing the at least one URL on the display device at a location overlaying the presented at least one hyperlink. In certain embodiments, the code is executable by the processor to identify the at least one URL in the received content using at least one of optical character recognition and programmatic hyperlink extraction.

In one embodiment, the received content comprises an image and the code is executable by the processor to perform a reverse image search using the image to determine at least one URL representing an online location associated with the image and present one or more interactive graphical elements representing the determined at least one URL representing the online location associated with the image.

In one embodiment, the received content comprises audio content and the identified at least one URL comprises a URL that is provided audibly during the online presentation. In certain embodiments, the at least one URL is identified based on a transcription of the audio content and the code executable by the processor to parse the transcription of the audio content to identify the at least one URL.

In one embodiment, the received content is presented during a livestream online presentation occurring in real-time and the interactive graphical element representing the at least one URL is presented on the display device during the livestream online presentation. In certain embodiments, the interactive graphical representation of the at least one URL is presented on the display device in a different location than where the received content is presented.

In one embodiment, the code is executable by the processor to verify that the link to the online location associated with the at least one URL is free of malware prior to presenting the interactive graphical element representing the at least one URL on the display device. In certain embodiments, the code is executable by the processor to generate a preview of the online location associated with the at least one URL and associate the preview with the interactive graphical element representing the at least one URL, the preview comprising at least one of a title, an image, and a description of the online location.

In one embodiment, the code is executable by the processor to invoke a virtual assistant to lookup information from the online location associated with the at least one URL in response to identifying the at least one URL. In some embodiments, the code is executable by the processor to access the online location associated with the at least one URL and present content from the online location on the display device during the online presentation.

A method for presenting links during an online presentation, in one embodiment, includes receiving, by a processor, content that is presented as part of an online presentation, processing the received content to identify at least one uniform resource locator ("URL") in the received content, and presenting an interactive graphical element representing the at least one URL on a display device. In one embodiment, the interactive graphical element includes a link to an online location associated with the URL such that the online location is accessible in response to interacting with the interactive graphical element.

In one embodiment, the received content comprises graphical content presented during the online presentation and the identified at least one URL comprises at least one hyperlink presented on the display device that is not interactive. In certain embodiments, the method includes presenting the interactive graphical element representing the at least one URL on the display device at a location overlaying the presented at least one hyperlink.

In one embodiment, the received content comprises audio content and the identified at least one URL comprises a URL that is provided audibly during the online presentation. In certain embodiments, the at least one URL is identified based on a transcription of the audio content that is parsed to identify the at least one URL.

In one embodiment, the received content is presented during a livestream online presentation occurring in real-time and the interactive graphical element representing the at least one URL is presented on the display device during the livestream online presentation.

In one embodiment, the method includes verifying that the link to the online location associated with the at least one URL is free of malware prior to presenting the interactive graphical element representing the at least one URL on the display device.

A computer program product for presenting links during an online presentation, in one embodiment, includes a computer readable storage medium having program instructions embodied therewith. In certain embodiments, the program instructions are executable by a processor to receive content that is presented as part of an online presentation, process the received content to identify at least one uniform resource locator ("URL") in the received content, and present an interactive graphical element representing the at least one URL on a display device. In one embodiment, the interactive graphical element includes a link to an online location associated with the URL such that the online location is accessible in response to interacting with the interactive graphical element.

FIG. 1 is a schematic block diagram illustrating one embodiment of a system 100 for presenting links during an online presentation. In one embodiment, the system 100 includes one or more information handling devices 102, one or more presentation apparatuses 104, one or more data networks 106, and one or more servers 108. In certain embodiments, even though a specific number of information handling devices 102, presentation apparatuses 104, data networks 106, and servers 108 are depicted in FIG. 1, one of skill in the art will recognize, in light of this disclosure, that any number of information handling devices 102, presentation apparatuses 104, data networks 106, and servers 108 may be included in the system 100.

In one embodiment, the system 100 includes one or more information handling devices 102. The information handling devices 102 may be embodied as one or more of a desktop computer, a laptop computer, a tablet computer, a smart phone, a smart speaker (e.g., Amazon Echo®, Google Home®, Apple HomePod®), an Internet of Things device, a security system, a set-top box, a gaming console, a smart TV, a smart watch, a fitness band or other wearable activity tracking device, an optical head-mounted display (e.g., a virtual reality headset, smart glasses, head phones, or the like), a High-Definition Multimedia Interface ("HDMI") or other electronic display dongle, a personal digital assistant, a digital camera, a video camera, or another computing device comprising a processor (e.g., a central processing unit ("CPU"), a processor core, a field programmable gate array ("FPGA") or other programmable logic, an application specific integrated circuit ("ASIC"), a controller, a microcontroller, and/or another semiconductor integrated circuit device), a volatile memory, and/or a non-volatile storage medium, a display, a connection to a display, and/or the like.

In certain embodiments, the information handling devices 102 are configured to host, execute, facilitate, and/or the like online presentations such as real-time livestream video or audio conferences, pre-recorded presentations that are streamed from a network such as the Internet, and/or the like. In such an embodiment, the information handling devices 102 may be equipped with speakers, microphones, display devices, and/or the like that are used to participate in, supervise, conduct, and/or the like an online presentation.

In general, in one embodiment, the presentation apparatus 104 is configured to receive content that is presented as part of an online presentation, process the received content to identify at least one uniform resource locator ("URL") in the received content, and present an interactive graphical element representing the at least one URL on a display device. The interactive graphical element, in one embodiment, includes a link to an online location associated with the URL such that the online location is accessible in response to interacting with the interactive graphical element.

In this manner, the presentation apparatus 104 dynamically presents interactive links on a client device for URLs that are presented on the client device by a presenter device, e.g., as part of a screen share, as spoken by a speaker in the online presentation, and/or the like. The presentation apparatus 104 can detect the URLs during the online presentation, e.g., during a real-time livestream and/or while a pre-recorded presentation is played or streamed, and thus does not preprocess the online presentation to identify the URLs prior to the online presentation being presented. The presentation apparatus 104 is described in more detail below with reference to FIGS. 2 and 3.

In certain embodiments, the presentation apparatus 104 may include a hardware device such as a secure hardware dongle or other hardware appliance device (e.g., a set-top box, a network appliance, or the like) that attaches to a device such as a head mounted display, a laptop computer, a server 108, a tablet computer, a smart phone, a security system, a network router or switch, or the like, either by a wired connection (e.g., a universal serial bus ("USB") connection) or a wireless connection (e.g., Bluetooth®, Wi-Fi, near-field communication ("NFC"), or the like); that attaches to an electronic display device (e.g., a television or monitor using an HDMI port, a DisplayPort port, a Mini DisplayPort port, VGA port, DVI port, or the like); and/or the like. A hardware appliance of the presentation apparatus 104 may include a power interface, a wired and/or wireless network interface, a graphical interface that attaches to a display, and/or a semiconductor integrated circuit device as described below, configured to perform the functions described herein with regard to the presentation apparatus 104.

The presentation apparatus 104, in such an embodiment, may include a semiconductor integrated circuit device (e.g., one or more chips, die, or other discrete logic hardware), or the like, such as a field-programmable gate array ("FPGA") or other programmable logic, firmware for an FPGA or other programmable logic, microcode for execution on a microcontroller, an application-specific integrated circuit ("ASIC"), a processor, a processor core, or the like. In one embodiment, the presentation apparatus 104 may be mounted on a printed circuit board with one or more electrical lines or connections (e.g., to volatile memory, a non-volatile storage medium, a network interface, a peripheral device, a graphical/display interface, or the like). The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the presentation apparatus 104.

The semiconductor integrated circuit device or other hardware appliance of the presentation apparatus 104, in certain embodiments, includes and/or is communicatively coupled to one or more volatile memory media, which may include but is not limited to random access memory ("RAM"), dynamic RAM ("DRAM"), cache, or the like. In one embodiment, the semiconductor integrated circuit device or other hardware appliance of the presentation apparatus 104 includes and/or is communicatively coupled to one or more non-volatile memory media, which may include but is not limited to: NAND flash memory, NOR flash memory, nano random access memory (nano RAM or "NRAM"), nanocrystal wire-based memory, silicon-oxide based sub-10 nanometer process memory, graphene memory, Silicon-Oxide-Nitride-Oxide-Silicon ("SONOS"), resistive RAM ("RRAM"), programmable metallization cell ("PMC"), conductive-bridging RAM ("CBRAM"), magneto-resistive RAM ("MRAM"), dynamic RAM ("DRAM"), phase change RAM ("PRAM" or "PCM"), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a wide area network ("WAN"), a storage area network ("SAN"), a local area network ("LAN") (e.g., a home network), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a Bluetooth® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

The one or more servers 108, in one embodiment, may be embodied as blade servers, mainframe servers, tower servers, rack servers, and/or the like. The one or more servers 108 may be configured as mail servers, web servers, application servers, FTP servers, media servers, data servers, web servers, file servers, virtual servers, and/or the like. The one or more servers 108 may be communicatively coupled (e.g., networked) over a data network 106 to one or more information handling devices 102 and may be configured to store content and to execute or run video/audio conferencing and/or other online presentation algorithms, programs, applications, processes, and/or the like.

Figure 2:
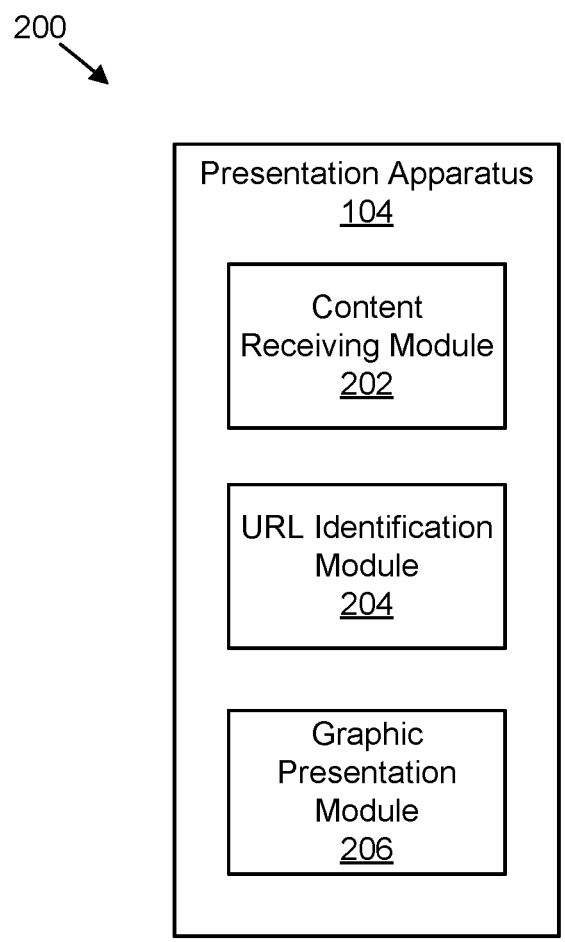
FIG. 2 is a schematic block diagram illustrating one embodiment of an apparatus for presenting links during an online presentation.

FIG. 2 is a schematic block diagram illustrating one embodiment of an apparatus 200 for presenting links during an online presentation. In one embodiment, the apparatus 200 includes an instance of a presentation apparatus 104. In one embodiment, the presentation apparatus 104 includes a content receiving module 202, a URL identification module 204, and a graphic presentation module 206, which are described in more detail below.

In one embodiment, the content receiving module 202 is configured to receive content that is presented as part of an online presentation. As used herein, an online presentation may include a video presentation, an audio presentation, a slideshow, and/or the like that is presented in real-time, e.g., livestream, or is prerecorded and streamed or downloaded for playback on a user's device. Examples may include a livestream video or audio conference made available using a conferencing program such as Zoom®, a prerecorded presentation available on a video or audio sharing site such as YouTube®.

Thus, in such an embodiment, the content may include videos, photos, slideshows (e.g., PowerPoint® presentations), audio, text, and/or the like. As part of the presentation, a presenter may share his/her screen to present documents, images, or other content during the presentation. In certain embodiments, the presenter may speak to explain or describe things during the presentation. The content receiving module 202 may receive the content as it is streamed to or downloaded by a client device, including both graphic and audio content.

In one embodiment, the URL identification module 204 is configured to process the received content to identify at least one uniform resource locator ("URL") in the received content. As used herein, a URL may refer to a web address or other reference to a web resource that specifies its location on a data network 106 and a mechanism for retrieving it. As it relates to the subject matter disclosed herein, a URL may include a reference to web pages (e.g., hypertext transfer protocol ("http")), file transfer (e.g., file transfer protocol ("ftp")), email (e.g., "mailto" links), database access (e.g., Java Database Connectivity ("JDBC")), and/or the like.

In such an embodiment, the URL identification module 204 identifies the at least one URL in the received content using at least one of optical character recognition ("OCR") and programmatic hyperlink extraction. For example, if a presenter is sharing a document that has a link displayed as part of the text or image, e.g., "http://www.uspto.gov," the URL identification module 204 may process an image of the shared document using OCR to identify a URL, which may have different formats as described above. The URL identification module 204 may further use pattern recognition to identify typical locations where URLs may be displayed, e.g., within the address bar of a browser window that is being shared during a desktop or window screen share.

The presenter may also make the shared document downloadable, e.g., from a cloud or other network location, before or during the presentation, which the URL identification module 204 may access and process to identify URLs within the content of the document, e.g., by using regular expressions, pattern recognition, or natural language processing, by using open extensible markup language ("XML") software development kits, and/or the like.

In another example embodiment, if the presented content contains a hyperlink, e.g., a reference to data that a user can follow by clicking or tapping, that includes a URL that is not visible to a client and therefore not detectable using OCR, the URL identification module 204 may process the content using programmatic hyperlink extraction by processing the code that is used to present the content, e.g., by processing hypertext markup language ("HTML"), extensible markup language ("XML"), or the like using a scripting language or tool such as JavaScript.

In one embodiment, the graphic presentation module 206 is configured to present an interactive graphical element representing the at least one URL on a display device, e.g., of a client device that is presenting the online presentation, that is executing a conferencing application, and/or the like. In one embodiment, the interactive graphical element includes a link to an online location associated with the URL such that the online location is accessible in response to interacting with the interactive graphical element. For example, the interactive graphical element may be a clickable link that references the online location associated with the URL.

In one embodiment, the graphic presentation module 206 presents the interactive graphical element as a link that overlays the URL that is presented on the display such that it appears as if the presented URL is clickable. For example, in one embodiment, the received content includes graphical content presented during the online presentation, e.g., a document that is being screen-shared and that includes URLs withing the content (e.g., text) of the document. In such an embodiment, the URL identification module 204 identifies at least one URL that includes at least one hyperlink presented on the display device that is not interactive, e.g., the URL is displayed, but the user at a client device cannot interact with the URL. The graphic presentation module 206 presents the interactive graphical element representing the at least one URL on the display device at a location overlaying the presented hyperlink. In such an embodiment, the graphic presentation module 206 dynamically relocates the overlayed interactive graphical element as the content presented on the display moves, e.g., is scrolled up or down, is closed (causing the interactive graphical element to disappear), and/or the like.

In some embodiments, the graphic presentation module 206 presents the interactive graphical element in a different region of the display, e.g., in a window or frame that lists links associated with URLs that are visible on the display, in a pop-up window, and/or the like, e.g., a chat window or frame. The different region may be a window that is separate from the window where the online presentation is being presented.

In one embodiment, the content receiving module 202 receives content that includes an image as part of the online presentation. In such an embodiment, the URL identification module 204 performs a reverse image search using the image to determine at least one URL representing an online location associated with the image.

For instance, the URL identification module 204 may perform an Internet search using the image to determine at least one URL associated with information about the image. For example, if the image is a picture of a country, the URL identification module 204 may submit the image as a search query to determine at least one URL for a resource/web page that includes information about the country, e.g., a Wikipedia link for the country.

The graphic presentation module 206 may present one or more interactive graphical elements representing the determined at least one URL for the determined online location associated with the image. For instance, the graphic presentation module 206 may present the image as a clickable link for the determined at least one URL or may present a clickable link for the determined at least one URL within a proximity of the image, or the like.

In one embodiment, the received content comprises audio content, e.g., for an audio presentation, podcast, or the like that may not include graphical elements, or may be in conjunction with a video conference or other online presentation that includes a combination of audio and video content.

In such an embodiment, the identified at least one URL comprises a URL that is provided audibly during the online presentation. For example, a presenter that is speaking during the online presentation may say or speak a URL such as "you can find more information about this on cnn.com," or "I read it last night on espn.com," or the like. Accordingly, the URL identification module 204 may detect the spoken URL (e.g., cnn.com, espn.com, or the like) using audio processing or analysis methods such as natural language processing.

In certain embodiments, the URL identification module 204 may generate, process, and/or parse a transcription of the audio content of the online presentation to determine or identify URLs that are spoken or otherwise audibly provided during the online presentation. For example, the URL identification module 204 may use regular expressions, pattern recognition, natural language processing, and/or the like to parse the transcription and identify URLs for webpages or other online or network resources referenced during the online presentation.

The graphic presentation module 206 may then present the determined or identified URLs as interactive graphical elements e.g., within a window or a frame at a point during the online presentation (either provided as a real-time livestream or as a pre-recorded presentation) when the URLs are provided audibly. In such an embodiment, the graphic presentation module 206 may first prompt the speaker or presenter for confirmation that the speaker or presenter would like interactive graphical elements representing URLs that the speaker or presenter provides to other participants in a different window, frame, or the like.

In one embodiment, when the received content is presented during a livestream online presentation occurring in real-time, the graphic presentation module 206 presents the interactive graphical element representing the at least one URL on the display device during the livestream online presentation, e.g., at a point during the presentation when it is presented on a display or is audibly provided. In other words, the URL identification module 204 dynamically identifies URLs and the graphic presentation module 206 presents the interactive graphical elements representing the URLs as they are provided, e.g., graphically or audibly presented, during the livestream online presentation.

Similarly, the URL identification module 204 dynamically identifies URLs that are presented during a prerecorded online presentation without preprocessing the online presentation. The graphic presentation module 206 may then present interactive graphical elements representing the identified URLs on the display device during playback of the presentation. In one embodiment, the URL identification module 204 collects, stores, saves, or the like a list of the URLs that are identified during the online presentation for review and access after the online presentation.

In this manner, the presentation apparatus 104 can provide interactive graphical elements for non-interactive URLs that are presented, graphically or audibly, during an online presentation, video or audio conference, and/or the like. Moreover, the presentation apparatus 104 processes the online presentation to identify and provide interactive graphical representations of the presented URLs dynamically while the online presentation is presented and without preprocessing content provided as part of the online presentation, either livestream or prerecorded.

Figure 3:
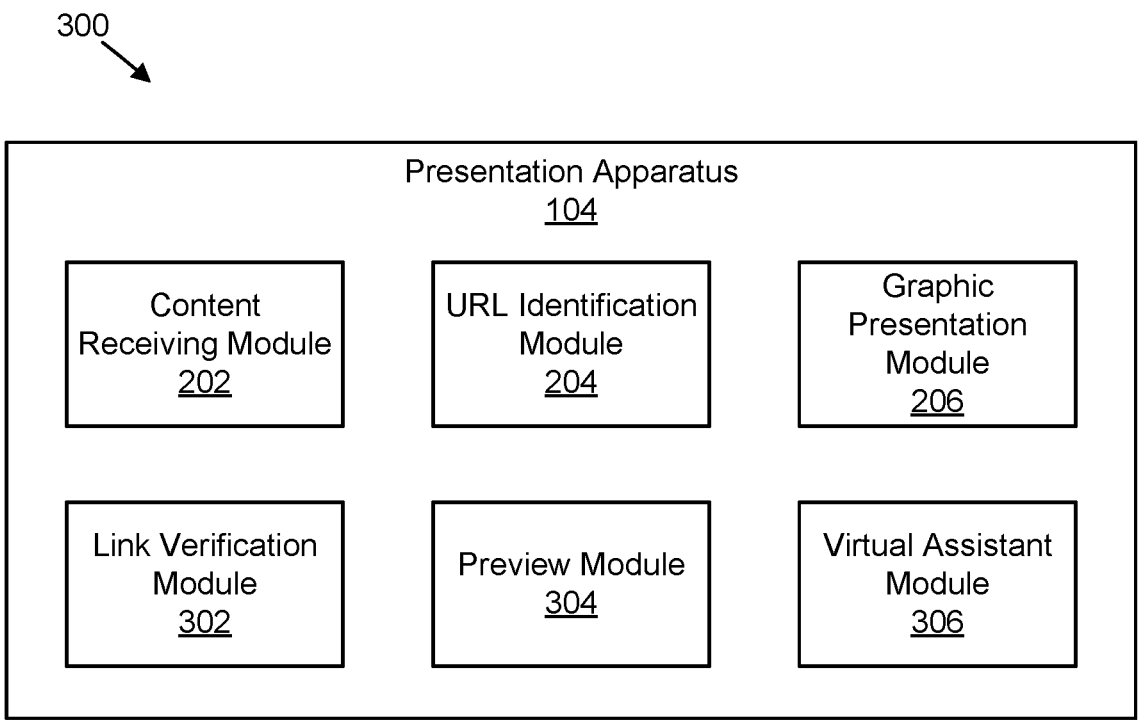
FIG. 3 is a schematic flow chart diagram illustrating one embodiment of another apparatus for presenting links during an online presentation.

FIG. 3 a schematic block diagram illustrating one embodiment of another apparatus 300 for presenting links during an online presentation. In one embodiment, the apparatus 300 includes an instance of a presentation apparatus 104. In one embodiment, the presentation apparatus 104 includes a content receiving module 202, a URL identification module 204, and a graphic presentation module 206, which may be similar to the content receiving module 202, the URL identification module 204, and the graphic presentation module 206 described above with reference to FIG. 2. In further embodiments, the presentation apparatus 104 includes a link verification module 302, a preview module 304, and a virtual assistant module 306, which are described in more detail below.

The link verification module 302, in one embodiment, is configured to verify that the link to the online location associated with the at least one URL is free of malware prior to presenting the interactive graphical element representing the at least one URL on the display device. As used herein, malware may refer to a collective name for a number of malicious software variants, including viruses, ransomware, and spyware. The link verification module 302, in certain embodiments, may check whether the URL link is on a blacklist of web resources to avoid, a whitelist of web resources to allow, a list of web resources that a firewall prevents access to, and/or the like. In further embodiments, the link verification module 302 invokes a third-party malware application using the URL link to determine whether the online resource that the URL link is directed to is malware or is otherwise malicious.

The preview module 304, in one embodiment, is configured to generate a preview of the online location associated with the at least one URL. In one embodiment, the preview module 304 may access the online location associated with the URL to pull or scrape information from the online location including the title, top image or other images, a description, the first few sentences or paragraphs of text content from the online location, and/or the like, and associate and present the information as a preview associated with the interactive graphical element that represents the URL.

The preview module 304 may present the preview information as a tooltip or other pop-up that is displayed when the user hovers over the interactive graphical element. The preview module 304 may present the preview information in a different window, frame, or the like that is displayed when the user clicks/taps on the interactive graphical element, when the user hovers over the interactive graphical element, when the user uses a key/mouse combination, e.g., ctrl-click, when the user uses a two-finger tap, or the like.

In one embodiment, the preview module 304 may automatically access the online location associated with the at least one URL, e.g., using a web browser or other application, to present content from the online location on the display device during the online presentation. For example, when a URL is presented as part of an online presentation on a display, the preview module 304 may open a web browser, e.g., Google Chrome®, or a web browser integrated with a video conferencing application, or the like, using the URL to present at least a portion of the content at the online location, e.g., at least a portion of web page, a file directory, and/or the like.

The virtual assistant module 306, in one embodiment, is configured to invoke a virtual assistant to lookup information from the online location associated with the at least one URL in response to identifying the at least one URL. The virtual assistant module 306, for instance, may be communicatively coupled with a smart speaker such as an Amazon Echo® or Alexa® device, a Google Home® device, or the like and may transmit the URL to the smart speaker to receive information about the URL, content from the URL, and/or the like on a display, as an audible output from the smart speaker, and/or the like.

Figure 4:
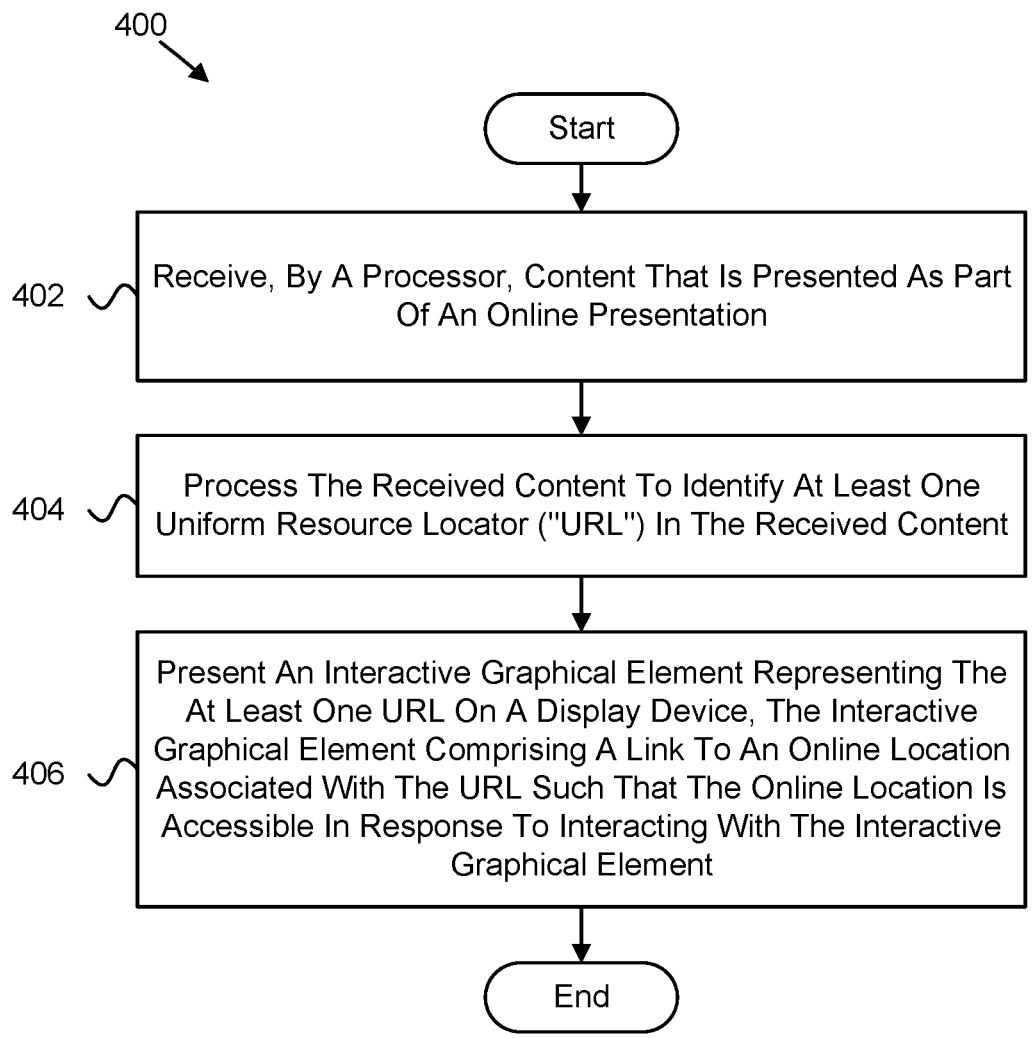
FIG. 4 is a schematic flow chart diagram illustrating one embodiment of a method for presenting links during an online presentation.

FIG. 4 is a schematic flow chart diagram illustrating one embodiment of a method 400 for presenting links during an online presentation. In one embodiment, the method 400 begins and receives 402, by a processor, content that is presented as part of an online presentation. In some embodiments, the method 400 processes 404 the received content to identify at least one URL in the received content.

In one embodiment, the method 400 presents 406 an interactive graphical element representing the at least one URL on a display device, and the method 400 ends. The interactive graphical element includes a link to an online location associated with the URL such that the online location is accessible in response to interacting with the interactive graphical element. In various embodiments, the content receiving module 202, the URL identification module 204, and the graphic presentation module 206 perform the various steps of the method 400.

Figure 5:
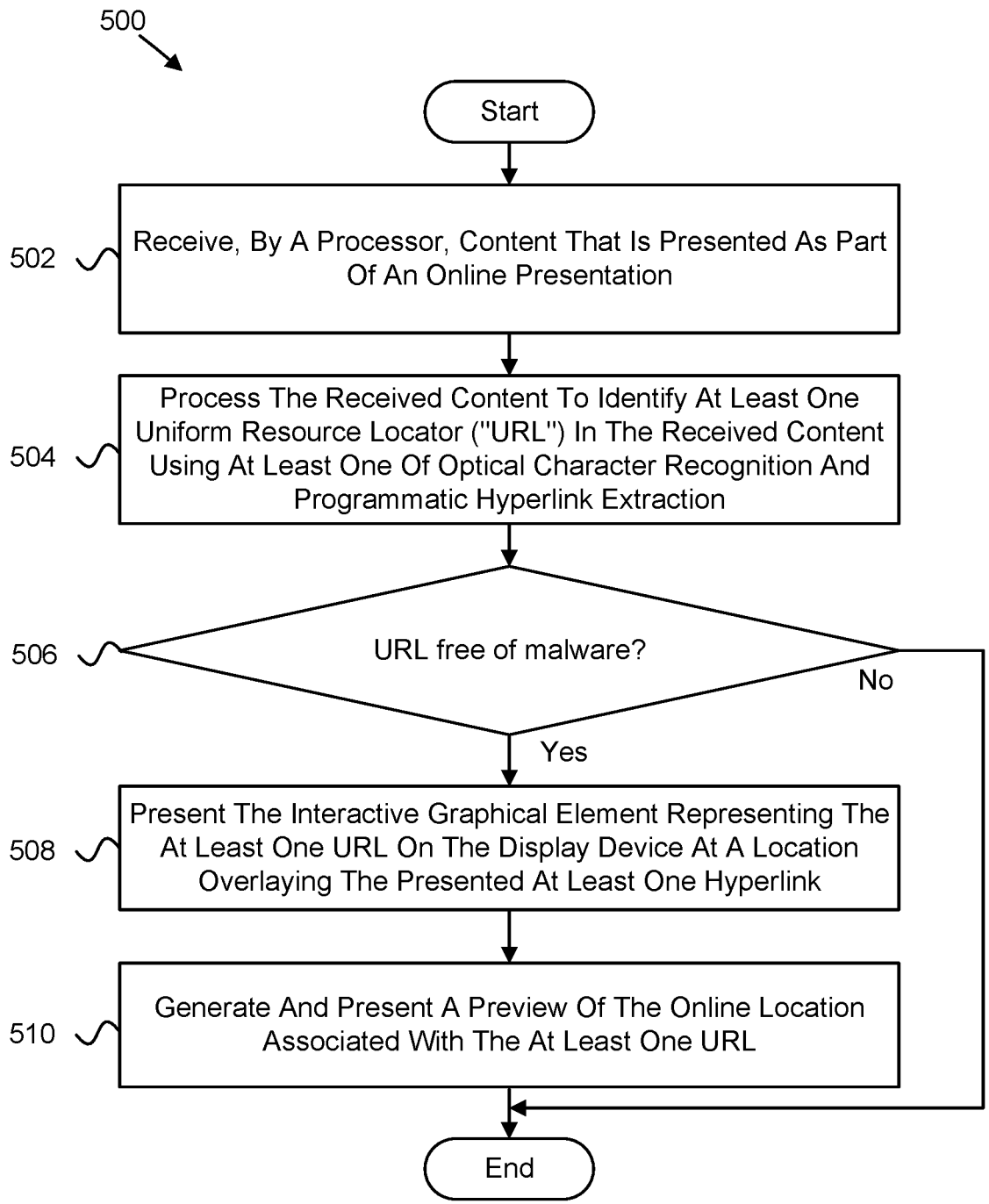
FIG. 5 is a schematic flow chart diagram illustrating one embodiment of a method for presenting links during an online presentation.

FIG. 5 is a schematic flow chart diagram illustrating one embodiment of a method 500 for presenting links during an online presentation. In one embodiment, the method 500 begins and receives 502, by a processor, content that is presented as part of an online presentation. In some embodiments, the method 500 processes 504 the received content to identify at least one uniform resource locator ("URL") in the received content using at least one of optical character recognition and programmatic hyperlink extraction.

In certain embodiments, the method 500 determines 506 whether the link to the online location associated with the at least one URL is free of malware. If not, the method 500 ends. Otherwise, in one embodiment, the method 500 presents 508 the interactive graphical element representing the at least one URL on the display device at a location overlaying the presented at least one URL/hyperlink. In certain embodiments, the method 500 generates 510 and presents a preview of the online location, e.g., website, associated with the at least one URL, and the method 500 ends. In various embodiments, the content receiving module 202, the URL identification module 204, the graphic presentation module 206, the link verification module 302, and the preview module 304 perform the various steps of the method 500.

Figure 6:
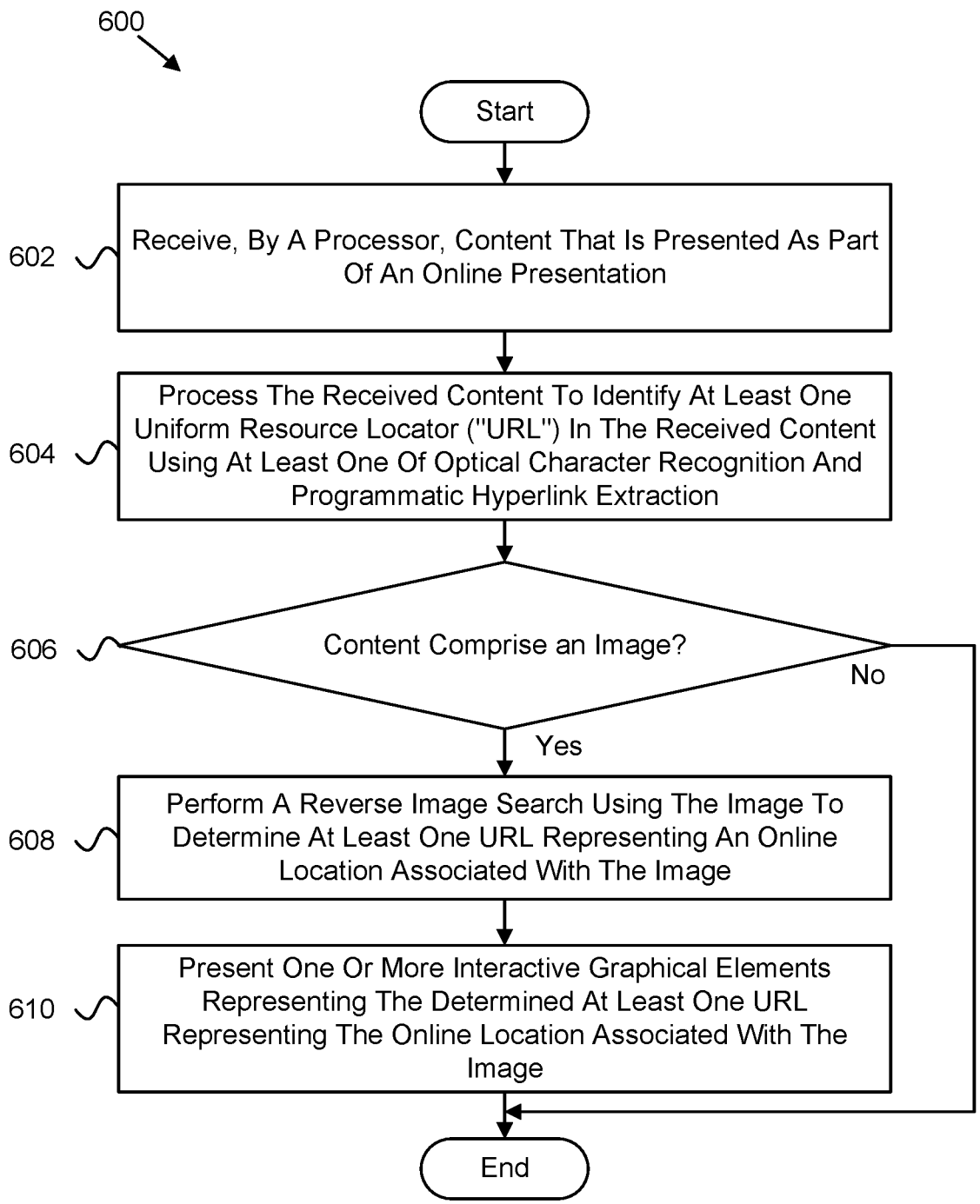
FIG. 6 is a schematic flow chart diagram illustrating one embodiment of another method for presenting links during an online presentation.

FIG. 6 is a schematic flow chart diagram illustrating one embodiment of a method 600 for presenting links during an online presentation. In one embodiment, the method 600 begins and receives 602, by a processor, content that is presented as part of an online presentation. In some embodiments, the method 600 processes 604 the received content to identify at least one uniform resource locator ("URL") in the received content using at least one of optical character recognition and programmatic hyperlink extraction.

In some embodiments, the method 600 determines 606 whether the content comprises an image. If not, the method 600 ends. Otherwise, in one embodiment, the method 600 performs 608 a reverse image search using the image to determine at least one URL representing an online location associated with the image. The method 600, in further embodiments, present 610 one or more interactive graphical elements representing the determined at least one URL representing the online location associated with the image, and the method 600 ends. In various embodiments, the content receiving module 202, the URL identification module 204, and the graphic presentation module 206 perform the various steps of the method 500.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
a processor; and
a memory that stores code executable by the processor to:
receive, by the processor, audio content that is audibly spoken by a presenter as part of an online presentation presented by the presenter;
generate, by the processor in real-time during the online presentation, a transcript of the received audio content;
process, by the processor in real-time during the online presentation, the transcript of the received audio content to identify, in real-time during the online presentation, at least one uniform resource locator ("URL") in the transcript of the received audio content as the online presentation is received in real-time;
transmit, by the processor in real-time during the online presentation, a prompt to the presenter to confirm that the presenter would like an interactive graphical element presented to a user in real-time during the online presentation;

receive, by the processor from the presenter in real-time during the online presentation, a response to the prompt; and present, by the processor on a display device in real-time during the online presentation, the interactive graphical element representing the at least one URL in response to the response to the prompt confirming that the presenter would like the interactive graphical element presented to the user in real-time during the online presentation, wherein:
the transcript of the received audio content is generated by the processor in response to the response to the prompt confirming that the presenter would like the interactive graphical element presented to the user in real-time during the online presentation.

2. The apparatus of claim 1, wherein:
the online presentation further comprises graphical content presented during the online presentation; and
the identified at least one URL comprises at least one hyperlink presented on the display device that is not interactive.

3. The apparatus of claim 2, wherein the code is executable by the processor to present the interactive graphical element representing the at least one URL on the display device at a location overlaying the presented at least one hyperlink.

4. The apparatus of claim 2, wherein the code is executable by the processor to identify at least a second URL in the received graphical content using at least one of optical character recognition and programmatic hyperlink extraction.

5. The apparatus of claim 2, wherein the received graphical content comprises an image and the code is executable by the processor to:
perform a reverse image search using the image to determine at least one URL representing an online location associated with the image; and
present one or more interactive graphical elements representing the determined at least one URL representing the online location associated with the image.

6. The apparatus of claim 1, wherein:
the received audio content is presented during a livestream online presentation occurring in real-time; and
the interactive graphical element representing the at least one URL is presented on the display device during the livestream online presentation.

7. The apparatus of claim 1, wherein the interactive graphical representation of the at least one URL is presented on the display device in a different location than where the received audio content is presented.

8. The apparatus of claim 1, wherein the code is executable by the processor to verify that the link to the online location associated with the at least one URL is free of malware prior to presenting the interactive graphical element representing the at least one URL on the display device.

9. The apparatus of claim 1, wherein the code is executable by the processor to:
generate a preview of the online location associated with the at least one URL; and
associate the preview with the interactive graphical element representing the at least one URL, the preview comprising at least one of a title, an image, and a description of the online location.

10. The apparatus of claim 1, wherein the code is executable by the processor to invoke a virtual assistant to lookup information from the online location associated with the at least one URL in response to identifying the at least one URL.

11. The apparatus of claim 1, wherein the code is executable by the processor to:
access the online location associated with the at least one URL; and
present content from the online location on the display device during the online presentation.

12. The apparatus of claim 1, wherein processing, by the processor in real-time during the online presentation, the transcript of the received audio comprises using at least one of regular expression processing, pattern recognition processing, and natural language processing to parse the transcript to identify the at least one URL in real-time during the online presentation.

13. The apparatus of claim 1, wherein:
the interactive graphical element that is presented to the user on the display device in real-time during the online presentation is presented on one of a different window and a different frame on the display device in real-time during the online presentation;
the interactive graphical element that is presented to the user on the display device in real-time during the online presentation comprises a link to an online location corresponding to the URL; and
the online location is accessible by the user during the online presentation in response to the user actuating the link during the online presentation.

14. A method, comprising:
receiving, by a processor, audio content that is audibly presented as part of an online presentation;
generating, by the processor in real-time during the online presentation, a transcript of the received audio content;
processing, by the processor in real-time during the online presentation, the transcript of the received audio content to identify, in real-time during the online presentation, at least one uniform resource locator ("URL") in the transcript of the received audio content as the online presentation is received in real-time;
transmitting, by the processor in real-time during the online presentation, a prompt to the presenter to confirm that the presenter would like an interactive graphical element presented to a user;
receiving, by the processor from the presenter in real-time during the online presentation, a response to the prompt; and
presenting, by the processor on a display device in real-time during the presentation, the interactive graphical element representing the at least one URL in response to the response to the prompt confirming that the presenter would like the interactive graphical element presented to the user in real-time during the online presentation,
wherein:
the transcript of the received audio content is generated by the processor in response to the response to the prompt confirming that the presenter would like the interactive graphical element presented to the user in real-time during the online presentation.

15. The method of claim 14, wherein:
the online presentation further comprises graphical content presented during the online presentation; and the identified at least one URL comprises at least one hyperlink presented on the display device that is not interactive.

16. The method of claim 14, wherein:
the received audio content is presented during a livestream online presentation occurring in real-time; and
the interactive graphical element representing the at least one URL is presented on the display device in real-time during the livestream online presentation.

17. The method of claim 14, further comprising verifying that the link to the online location associated with the at least one URL is free of malware prior to presenting the interactive graphical element representing the at least one URL on the display device.

18. The method of claim 14, wherein:
the interactive graphical element that is presented to the user on the display device in real-time during the online presentation is presented on one of a different window and a different frame on the display device in real-time during the online presentation;
the interactive graphical element that is presented to the user on the display device in real-time during the online presentation comprises a link to an online location corresponding to the URL; and
the online location is accessible by the user during the online presentation in response to the user actuating the link during the online presentation.

19. A computer program product, comprising a computer readable storage medium having program instructions embodied therewith, the program instructions executable by a processor to cause the processor to:
receive audio content that is audibly presented as part of an online presentation;
process the received audio content to identify, in real-time during the online presentation, at least one uniform resource locator ("URL") in the received audio content as the online presentation is received in real-time;
transmit, in real-time during the online presentation, a prompt to the presenter to confirm that the presenter would like an interactive graphical element presented to a user in real-time during the online presentation;
receive, from the presenter in real-time during the online presentation, a response to the prompt; and
present, on a display device in real-time during the online presentation, the interactive graphical element representing the at least one URL in response to the response to the prompt confirming that the presenter would like the interactive graphical element presented to the user in real-time during the online presentation,
wherein:
the transcript of the received audio content is generated by the processor in response to the response to the prompt confirming that the presenter would like the interactive graphical element presented to the user in real-time during the online presentation.

20. The computer program product of claim 19, wherein:
the interactive graphical element that is presented to the user on the display device in real-time during the online presentation is presented on one of a different window and a different frame on the display device in real-time during the online presentation;
the interactive graphical element that is presented to the user on the display device in real-time during the online presentation comprises a link to an online location corresponding to the URL; and
the online location is accessible by the user during the online presentation in response to the user actuating the link during the online presentation.

* * * * *